J. A. GARDNER.
BEAN SORTER.
APPLICATION FILED FEB. 20, 1914.
1,097,754.
Patented May 26, 1914.
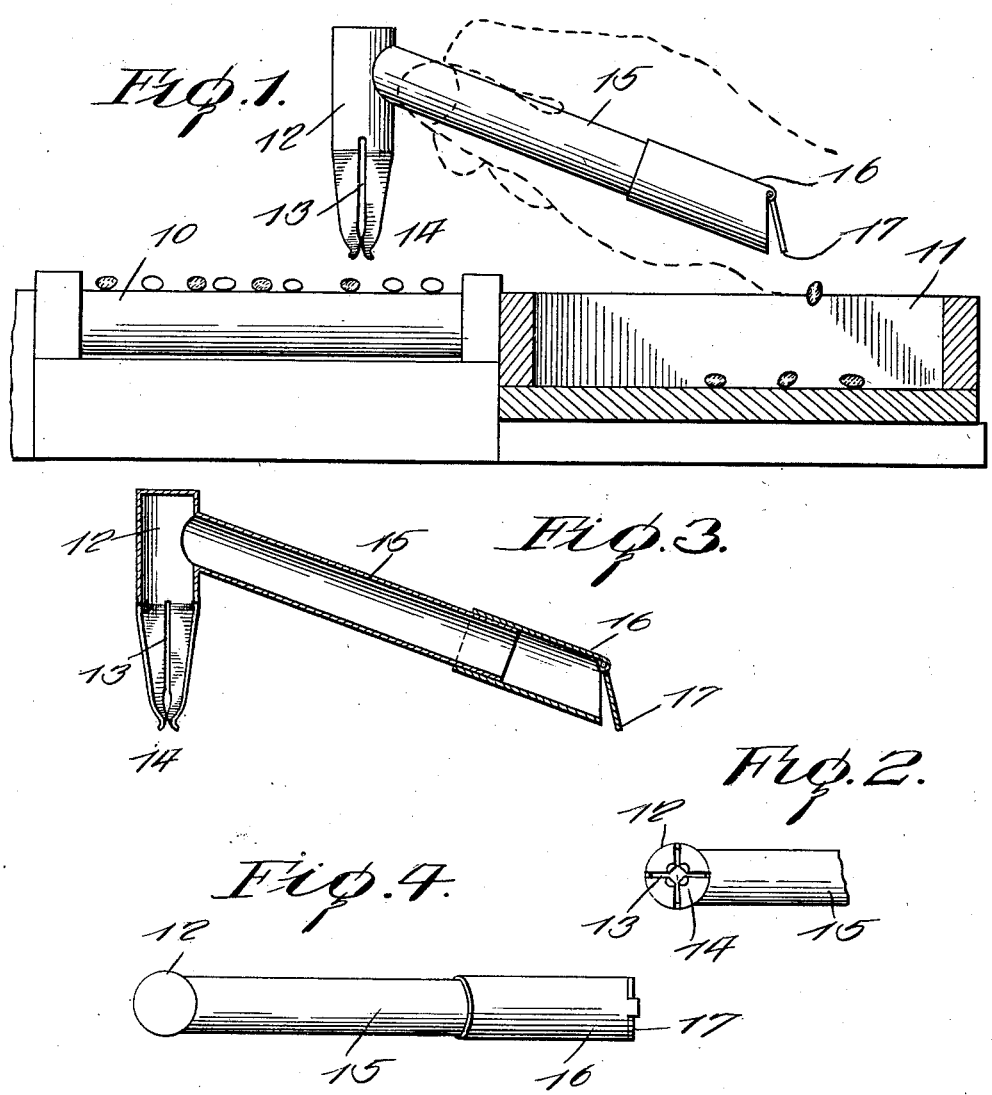
Inventor
J. A. Gardner
Witnesses
By
Attorneys

UNITED STATES PATENT OFFICE.

JAMES A. GARDNER, OF ALMA, MICHIGAN.

BEAN-SORTER.

1,097,754. Specification of Letters Patent. Patented May 26, 1914.

Application filed February 20, 1914. Serial No. 820,060.

*To all whom it may concern:*

Be it known that I, JAMES A. GARDNER, a citizen of the United States, residing at Alma, in the county of Gratiot, State of Michigan, have invented certain new and useful Improvements in Bean-Sorters; and I do hereby declare the following to be a full, clear, and exact description of the invention, such as will enable others skilled in the art to which it appertains to make and use the same.

This invention relates to improvements in bean sorters and particularly to devices for use in picking inferior or imperfect beans from a mass.

The principal object of the invention is to provide a simple and novel device which is adapted to be held in the hand of the user, and which can be made to pick up the inferior beans and automatically deliver them into a convenient receptacle.

Another object is to provide a device of this character which is adjustable, and which is provided with means to deliver the beans to the receptacle without danger of the beans jumping from the receptacle when they strike the bottom thereof.

Other objects and advantages will be apparent from the following description, when taken in connection with the accompanying drawings.

In the drawings: Figure 1 is a side view, partly in section, showing my device in use. Fig. 2 is a bottom plan view of the bean engaging portion of the device. Fig. 3 is a vertical longitudinal sectional view through the device. Fig. 4 is a top plan view of the device.

Referring particularly to the accompanying drawings, 10 represents a tray of the ordinary machine in which beans are picked by hand, and 11 a suitable receptacle disposed close to the tray for receiving the inferior or imperfect beans which are picked from the tray.

My picking device comprises a vertical hollow head portion 12, the lower end of which is split longitudinally as at 13 to form a plurality of resilient picking fingers 14. The extremities of these fingers are slightly outturned as shown so as to readily slide on the beans to cause the fingers to spread apart and permit the bean to pass upwardly into the head 12. At one side of the upper end of the head is connected a tube 15 which forms the handle of the device and is grasped in the hand of the user. The rear end of the tube is provided with an adjustable sleeve or tube 16 telescoped on the tube 15 and arranged to be moved back and forth to vary the length of the tube. In the lower end of the sleeve 16 is a door 17 hinged to the upper side of the sleeve and against which the beans strike when they roll down through the tube.

In the operation of the device the tube 15 is grasped in the hand of the user and is held in such position that the head 12 is disposed over the tray 10 and the discharge end of the tube 16 over the receptacle 11. By pressing the fingers 14 on to an imperfect or inferior bean, the same will be forced up between the fingers and thus held. The act of picking up the inferior beans is continued, and as the beans enter the fingers, they will be forced up in a mass until they will flow over into the tube 15, and said overflow run down the tube 15, striking the door 17 which checks the force of the beans and permits them to drop gently into the receptacle. Thus the beans will be gently and positively delivered to the receptacle without danger of the beans jumping out of the receptacle when they strike the bottom thereof.

Applicant is fully aware of the patent to Foster, 1,079,913, patented Nov. 25, 1913 for a bean sorter, but this device has the disadvantage that the picker must necessarily be raised and inverted to dump the beans collected. The present device is an improvement of the patent to Foster and is intended to obviate the necessity of ceasing the operation of picking up the beans to empty them, the operation of picking being carried on uninterruptedly, while the beans are automatically disposed of.

What is claimed is:—

1. A bean sorting device comprising a bean lifting head having resilient fingers, and a hollow handle carried by the head arranged to receive and convey beans from the head.

2. A bean sorting device comprising a hollow bean lifting head provided with bean engaging spring fingers, a hollow tubular handle connected to the head and arranged to receive and deliver beans from the head, and a swinging checking device carried by the lower end of the handle.

3. In a bean sorting device, a bean lifting element, a bean conveying element connected to the lifting element, and means carried by the conveying element for checking the flow of beans therethrough.

In testimony whereof, I affix my signature, in the presence of two witnesses.

JAMES A. GARDNER.

Witnesses:
JOHN D. SULLIVAN,
A. O. HYDE.

Copies of this patent may be obtained for five cents each, by addressing the "Commissioner of Patents, Washington, D. C."